(12) United States Patent
Randall

(10) Patent No.: X1377
(45) Date of Patent: Oct. 1, 1810

(54) WRITING,MODE OF TEACHING

(76) Inventor: Samuel Randall

United States Patent

Patent No.: X1377

Samuel Randall

Letters Patent

The Schedule referred to in these Letters Patent and making
part of the same containing a description in the words of the said
Samuel Randall himself of his improvement in the art
of Penmanship The Alphabets large, small and Capitals or what
ever it may be desired the Scholar or pupil should practice) are en-
graved on a Slate as fine or by as small a mark as can easily
be seen by the pupil, who is to trace said engraved letters with
a pencil tapered regularly to a point, as soon as the pupil gets
through the Copy the letters which he has made with his pencil
are obliterated with a sponge or cloth or otherwise but the en-
graved letters remain for the pupil to trace over again and
again & by which he soon obtains the proper shape and
slant of every letter which is by far the most difficult part in
the process of obtaining the art of Writing The process on paper is somewhat similar. Whatever is intended for
the pupil to write is impressed on the paper from the copper plate
or otherwise as fine a hair stroke as the engraver can make except
the line on top which is to be swelled to proper boldness for the pupil
to swell his letters by, the hair letters below being designed to guide him
to the proper shape and slant of the letters only — In short the art
consists in tracing on a slate with a pencil or on paper with
a pen, letters previously formed in a hair stroke as stated above.
Which art I give the name of traceography Witnesses
Seth Peck
Benjamin Randall Samuel Randall